Jan. 31, 1939.　　　M. V. GROVES　　　2,145,790
HYDRAULIC OR AIR BRAKE SAFETY CHECK
Filed Dec. 6, 1937
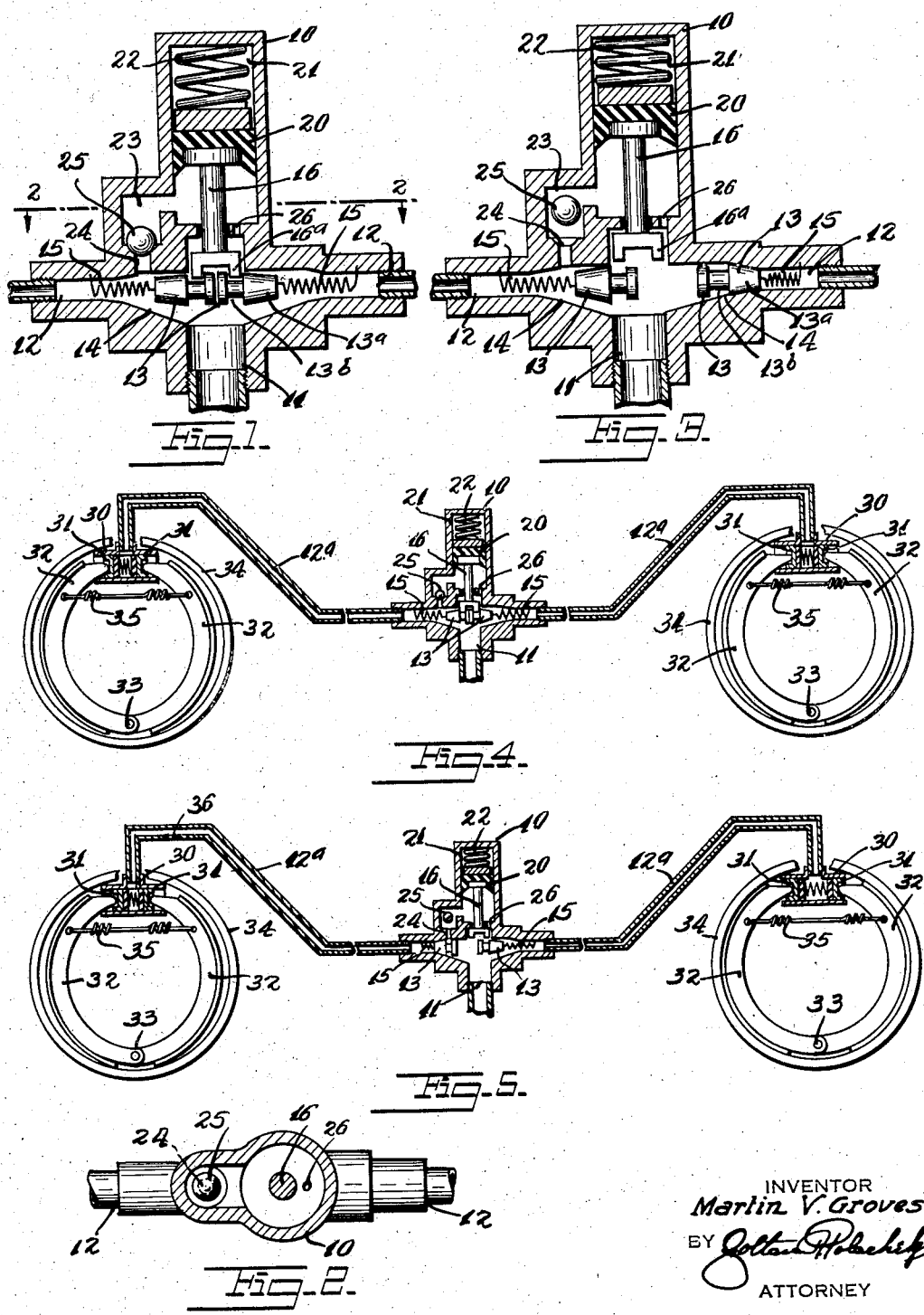
INVENTOR
Martin V. Groves
BY
ATTORNEY Patented Jan. 31, 1939

2,145,790

UNITED STATES PATENT OFFICE 2,145,790

HYDRAULIC OR AIR BRAKE SAFETY CHECK

Martin V. Groves, Brooklyn, N. Y.

Application December 6, 1937, Serial No. 178,282

6 Claims. (Cl. 303—84)

This invention relates to new and useful improvements in a hydraulic or air brake safety check.

The invention has for an object the construction of a check which will function to close a line of hydraulic or air brake system when that particular line has a leak in it. After the line is closed it is then possible to apply full pressure through the remaining portions of the braking system.

More specifically, the invention contemplates a safety check which is characterized by a body having an inlet for connection with a master line of a brake system and having outlets for connection with the brake cylinders. It is proposed to provide a plug for each outlet cooperative with a seat for closing each outlet. It is proposed to provide a resilient means for each plug for normally holding it off its seat so that it automatically engages upon its seat if there is a draft through the line.

The invention also contemplates a lock plunger for holding the plugs fixed in their normally open positions, and means for moving the plunger to release the plugs operable automatically by built up pressure in the body so that each plug may move individually to close its outlet if a draft is passing through same.

For further comprehension of the invention, and of the objects and advantages thereof, reference will be had to the following description and accompanying drawing, and to the appended claims in which the various novel features of the invention are more particularly set forth.

In the accompanying drawing forming a material part of this disclosure:—

Fig. 1 is a vertical sectional view of a safety check constructed according to this invention.

Fig. 2 is a horizontal sectional view taken on the line 2—2 of Fig. 1.

Fig. 3 is a view similar to Fig. 1 but illustrating the parts in a different condition.

Fig. 4 is a schematic view showing the application of the check to a brake system.

Fig. 5 is a view similar to Fig. 4 but showing the parts in different conditions.

The hydraulic or air brake safety check, according to this invention, comprises a body 10 having an inlet 11 for connection with a master line of a brake system and having outlets 12 for connection with the brake cylinders. A plug 13 is provided for each outlet 12 cooperative with a tapered seat 14 for closing the outlet. Resilient means in the form of a spring 15 is provided for each plug 13 for normally holding it off its seat.

A lock plunger 16 serves to normally hold the plugs 13 fixed in their normally open positions. A means is provided for moving the lock plunger 16 to release the plugs 13 operable by built up pressure in the body 10 so that each plug may move individually to close its outlet if a draft is passing through same.

Each plug 13 has a tapered forward end 13$^a$ and a peripheral grooved rear end 13$^b$. On the inner end of the plunger 16 there are teeth 16$^a$ engageable with the grooves 13$^b$ of the plugs to hold the plugs against moving to their closed positions. The outer end of the plunger 16 is provided with a piston 20 slidable in a cylinder 21 formed in the body 10. A spring 22 urges the piston forward so that the teeth 16$^a$ normally engage the grooves 13$^b$.

The underside of the piston 20 communicates with a chamber 23 which is connected by a pass 24 to the inlet 11 of the body 10. A one way valve 25 controls the pass 26 so that fluid may enter the chamber 23 but is arrested from passing out from the chamber. The chamber 23 has a small bypass opening 26 by which it is connected back to the inlet 11.

In Fig. 4 the safety check is shown connected up with two brakes. There are pipes 12$^a$ connected with the outlets 12, and these pipes extend to cylinders 30 stationarily mounted. Each cylinder 30 has a pair of end pistons 31 engaging against the ends of brake shoes 32. These brake shoes are pivotally supported by the pintles 33 and in expanded positions engage the brake drum 34. A spring 35 normally holds the brake shoes in their open positions.

In Fig. 5 the identical diagram to that shown in Fig. 4 is illustrated with the exception that the safety check is operating and one brake is shown cut off, while the other is "on". This condition will take place when there is a leak 36 in the line of the brake which is cut off.

The operation of the device is as follows:

Normally, when the brake is not applied the device is in the condition shown in Fig. 4. When pressure is applied to the brake pedal, not shown on the drawing, there will be a rise of pressure in the inlet 11 from the master cylinder or compressor. This rise of pressure will reach a point where the increase of pressure in the lines 12 will be sufficient to lift the check valve 25. The increased pressure then enters the chamber 23 and forces the piston 20 outwards. The plunger 16 therefor moves outwards and the plugs 13 are released, but they will be held in their normal position by the compression springs 15.

If there is no leak in the lines, the plugs 13 are in and will remain in the positions as illustrated in Fig. 1. It is possible for the operator of the brake to continue increasing the pressure applied to the brake shoes 32, which in turn act against the brake drums 34. When the brake pedal is released the pressure will fall in the line 11 to the master cylinder or compressor, and the springs 35 will open the brake shoes causing the hydraulic fluid or air to be forced back out through the line 11. The excess fluid within the chamber 23 will pass through the bleed 26 to discharge into the line 11, and the spring 22 will then return the piston 20 and thus the plunger 16 to its original position where the teeth 16ª engage the plugs 13.

If there is a leak in the line, as indicated by the numerals 36 in Fig. 5, the operation of the device will be different. When the pressure is initially rising in the line 11 due to pressing the brake pedal, a pressure will be built up within the lines 12. It must be assumed that the leak 36 is not sufficiently bad to permit so rapid an escape of the hydraulic fluid or air that it is impossible to build up a pressure. Generally leaks at the outset are quite small. As the pressure builds up in the lines 12 the valve 25 will be opened and the pressure will enter the chamber 23, causing the plunger 16 to rise and freeing the plugs 13. Now when greater and greater pressure is applied by pressing down hard on the brake pedal (as takes place during the latter part of the application of the brakes) there will be a tendency for an appreciable amount of fluid to escape from the break 36. This will cause a draft in the particular line 12 and the plug 13 will instantly move to close this line against the force of associated spring 15. When this particular line is closed the pressure within the other lines 12 may reach the maximum for properly applying the other brakes.

When the brake pedal is released the pressure falls throughout the system and the plug 13, which closed the particular passage 12 (this is the condition of the device shown in Fig. 5) will be moved back to its initial position by reason of spring 15, as shown in Fig. 1. The plunger 16 will return to its original position, delayed somewhat by the necessity of the pressure 23 blowing off through the bleed 26. In its initial position the plunger 16 will again grip and hold each of the plugs 13.

While I have illustrated and described the preferred embodiments of my invention, it is to be understood that I do not limit myself to the precise constructions herein disclosed and the right is reserved to all changes and modifications coming within the scope of the invention as defined in the appended claims.

Having thus described my invention, what I claim as new, and desire to secure by United States Letters Patent is:—

1. A hydraulic or air brake safety check, comprising a body having an inlet for connection with a master line of a brake system and having outlets for connection with the brake cylinders, a plug for each outlet cooperative with a seat for closing each outlet, resilient means for each plug for normally holding it off its seat, a lock plunger for holding said plugs fixed in their normal open positions, and means for moving said lock plunger to release said plugs operable by built-up pressure in said body whereupon each plug may then move individually to close its outlet if a draft is passing through same.

2. A hydraulic or air brake safety check, comprising a body having an inlet for connection with a master line of a brake system and having outlets for connection with the brake cylinders, a plug for each outlet cooperative with a seat for closing each outlet, resilient means for each plug for normally holding it off its seat, a lock plunger for holding said plugs fixed in their normal open positions, and means for moving said lock plunger to release said plugs operable by built-up pressure in said body whereupon each plug may then move individually to close its outlet if a draft is passing through same, said resilient means comprising springs attached to said plugs and to said outlet.

3. A hydraulic or air brake safety check, comprising a body having an inlet for connection with a master line of a brake system and having outlets for connection with the brake cylinders, a plug for each outlet cooperative with a seat for closing each outlet, resilient means for each plug for normally holding it off its seat, a lock plunger for holding said plugs fixed in their normal open positions, and means for moving said lock plunger to release said plugs operable by built-up pressure in said body whereupon each plug may then move individually to close its outlet if a draft is passing through same, said lock plunger having a toothed end with the teeth thereof engageable in grooves formed in said plugs.

4. A hydraulic or air brake safety check, comprising a body having an inlet for connection with a master line of a brake system and having outlets for connection with the brake cylinders, a plug for each outlet cooperative with a seat for closing each outlet, resilient means for each plug for normally holding it off its seat, a lock plunger for holding said plugs fixed in their normal positions, and means for moving said lock plunger to release said plugs operable by built-up pressure in said body whereupon each plug may then move individually to close its outlet if a draft is passing through same, comprising a piston on the outer end of said plunger and slidable in a chamber in said body, resilient means urging the piston inwards, and a one way valve for controlling the passage of braking substance from said body into said chamber to move said piston against the action of said spring.

5. A hydraulic or air brake safety check, comprising a body having an inlet for connection with a master line of a brake system and having outlets for connection with the brake cylinders, a plug for each outlet cooperative with a seat for closing each outlet, resilient means for each plug for normally holding it off its seat, a lock plunger for holding said plugs fixed in their normal open positions, and means for moving said lock plunger to release said plugs operable by built-up pressure in said body whereupon each plug may then move individually to close its outlet if a draft is passing through same, comprising a piston on the outer end of said plunger and slidable in a chamber in said body, resilient means urging the piston inwards, and a one way valve for controlling the passage of braking substance from said body into said chamber to move said piston against the action of said spring, and a bleed from said chamber back into said body.

6. A hydraulic or air brake safety check, comprising a body having an inlet for connection with a master line of a brake system and having outlets for connection with the brake cylinders, a plug for each outlet cooperative with a seat for closing each outlet, resilient means for each plug for normally holding it off its seat, a lock plunger for holding said plugs fixed in their normal open positions, and means for moving said lock plunger to release said plugs operable by built-up pressure in said body whereupon each plug may then move individually to close its outlet if a draft is passing through same, comprising a piston on the outer end of said plunger and slidable in a chamber in said body, resilient means urging the piston inwards, and a one way valve for controlling the passage of braking substance from said body into said chamber to move said piston against the action of said spring, said spring acting against said piston and a portion of said body.

MARTIN V. GROVES.